(12) United States Patent
Gretz

(10) Patent No.: US 7,350,659 B1
(45) Date of Patent: *Apr. 1, 2008

(54) FLEXIBLE AND CUTTABLE PLASTIC BOX EXTENDER WITH ONLY TWO OPPOSITE FLANGES

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 604 days.

This patent is subject to a terminal disclaimer.

(21) Appl. No.: 10/914,007

(22) Filed: Aug. 6, 2004

Related U.S. Application Data

(63) Continuation-in-part of application No. 09/956,610, filed on Sep. 19, 2001, now Pat. No. 7,077,280.

(51) Int. Cl.
*H02G 3/08* (2006.01)

(52) U.S. Cl. ....................................................... 220/3.2

(58) Field of Classification Search ..................... None
See application file for complete search history.

(56) References Cited

U.S. PATENT DOCUMENTS

| 5,736,674 | A  | * | 4/1998 | Gretz ........................... 174/50 |
| 6,812,405 | B1 | * | 11/2004 | Hull et al. ..................... 174/58 |
| 7,077,280 | B1 | * | 7/2006 | Gretz .......................... 220/3.7 |

* cited by examiner

*Primary Examiner*—Stephen j. Castellano

(57) ABSTRACT

A one-piece plastic part for use as an electrical box extender having a rectangular outer opening and an inner opening. The part has two narrow sides and two wide sides joined at their corners to define the outer and inner opening. Two flanges are coplanar with and extend from the two narrow sides. The extender can be inserted into an existing electrical box with the four sides capable of flexing to accommodate the box until the flanges are flush with a surface of newly installed sheet rock. The box extender can be ganged together when necessary. No flanges are used on the two wide sides of the part. One embodiment shows the use of two opposite inchoate flangeless sides.

1 Claim, 11 Drawing Sheets

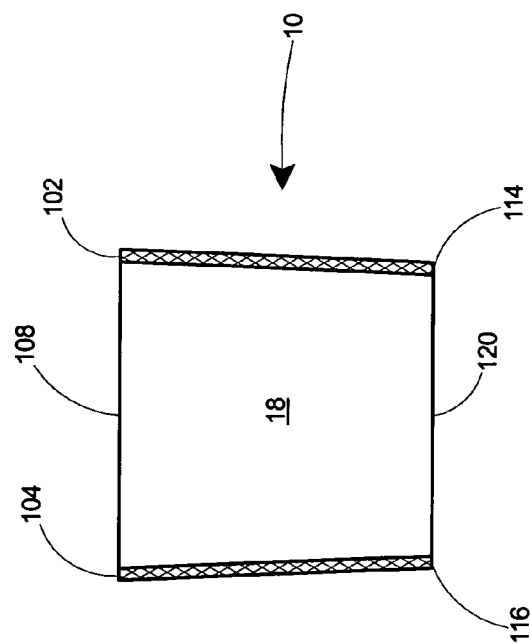
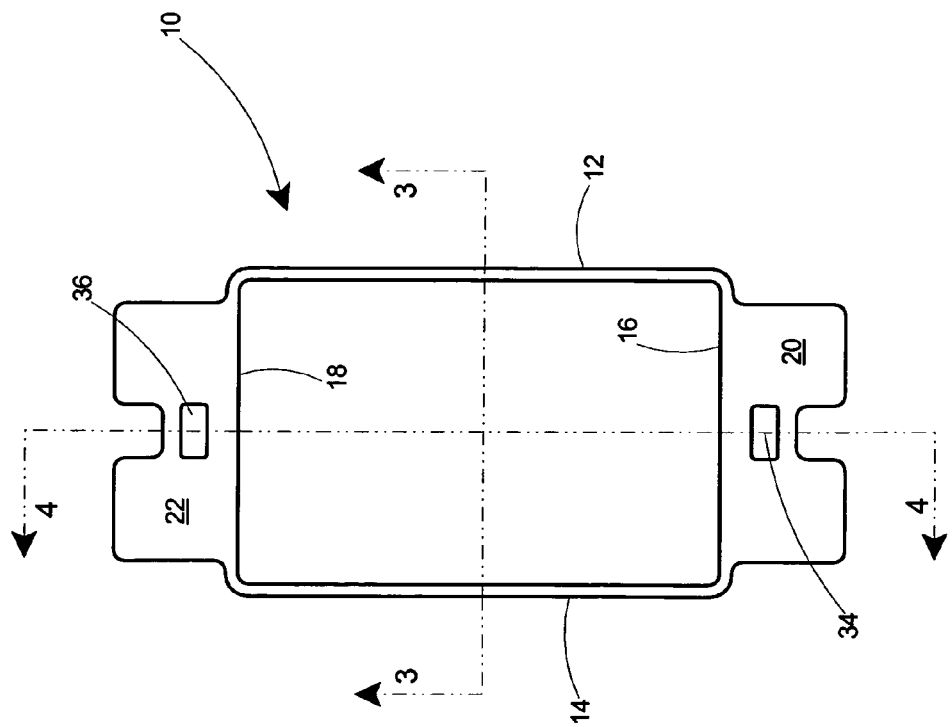
Fig. 3
Fig. 2

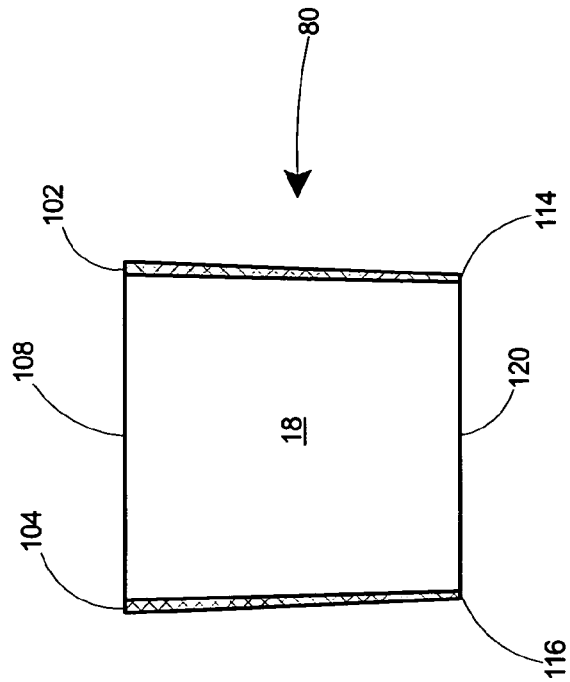
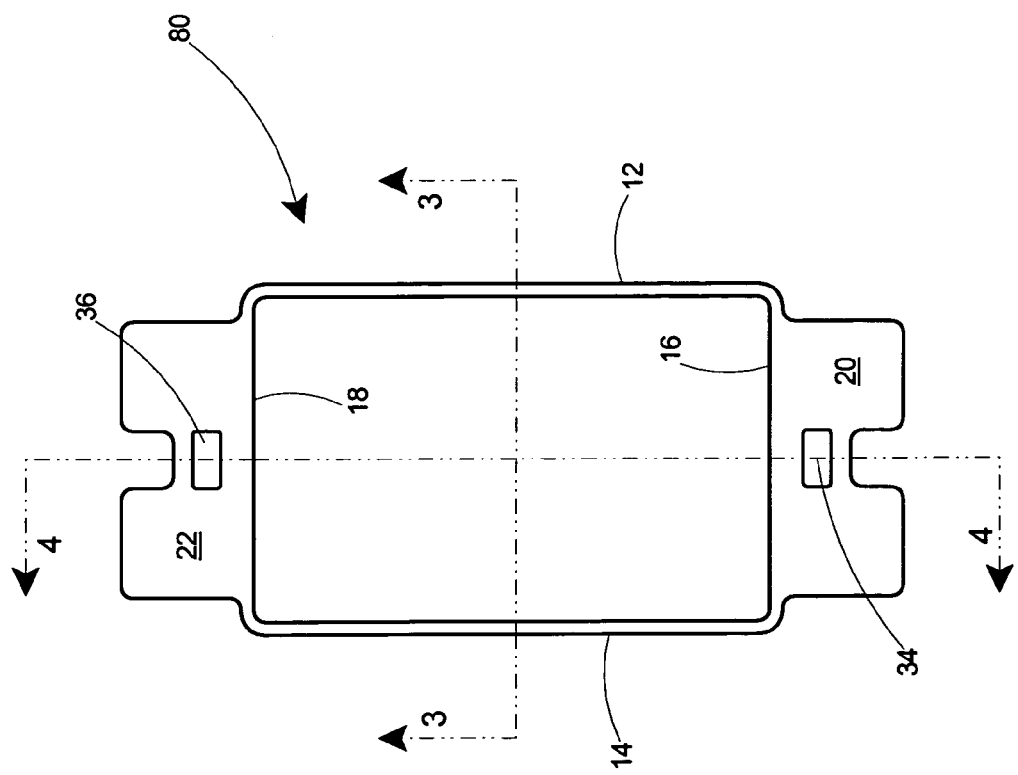

FLEXIBLE AND CUTTABLE PLASTIC BOX EXTENDER WITH ONLY TWO OPPOSITE FLANGES

This application is a Continuation-In-Part of U.S. patent application Ser. No. 09/956,610 entitled "Electric Box Extender and Supplemental Part", filed Sep. 19, 2001, now U.S. Pat. No. 7,077,280.

FIELD OF THE INVENTION

This invention relates to flexible, cuttable, and insulating plastic sleeve and box extensions, and particularly to an improved part that is easier to install and accepts bulky electrical devices such as a ground fault circuit interrupter (GFCI) that insert within electrical boxes and provide electrical insulation.

BACKGROUND OF THE INVENTION

Electrical boxes are commonly used to provide electrical service at convenient locations within buildings. The electrical boxes are commonly formed of plastic or metal and are usually securely fastened by screws or nails to the framework to the building. In newly constructed buildings, the open face of the electrical box, in which an electrical device such as an outlet or switch will be mounted, is usually flush with the surface of the wall or ceiling in which it is installed.

When existing buildings are renovated or restored, it is common for renovators to lay down new sheet stock such as sheet rock, paneling, etc., over the existing ceilings or walls. This causes the existing electrical boxes to become recessed within the wall by the thickness of the new sheet stock.

To solve this problem, box extenders of several different types have been developed.

SUMMARY OF THE INVENTION

This invention comprises a flexible, cuttable, insulating sleeve and box extender for use with electrical boxes. It is used for bringing electrical devices such as electrical outlets, switches, ground fault circuit outlets, etc., flush with newly installed sheet stock or the like in a renovated building and may also be used to insulate electrical devices from their associated electrical box. It is both a box extender and/or device protector.

A first embodiment of the insulated tapered sleeve and box extender consists of a one-piece molded flexible plastic part having an outer opening at an outer end; an inner opening at an inner end, and thin, cuttable sides of substantially the same thickness. The part can be inserted into an existing electrical box to either extend an electrical box for an outlet, switch, etc., so that it will be flush with a new surface or insulate an electrical device or both. A second embodiment is similar to the first embodiment except the thickness of the sides from the outer opening to the inner opening is gradually more thinner. A third embodiment utilizes opposite inchoate flangeless sides.

The insulating sleeve and extender part can also be used as a device insulator in those locations where an electrical device does not need to be extended to a new wall surface but rather where there is a limited amount of space to create a secure device, which is not prone to shorting out. A typical example would be the installation of a GFCI device in an electrical box. The terminals on the side of a GFCI are close fitting to the side of a metal electrical box and frequently the GFCI will be tripped when the terminals contact the side of the box. The sleeve and extender is inserted within an existing an existing electrical box to act as a device insulator and keep bulky electrical devices insulated from the surrounding electrical box and can also be used as a box extender if needed.

One-piece plastic box extenders that are flexible, cuttable, and insulating are already being used based on the inventions of the present inventor. These are shown in U.S. patent application Ser. No. 09/792,176 filed Feb. 23, 2001 and U.S. patent application Ser. No. 09/817,608 filed Mar. 26, 2001 which is a continuation-in-part of U.S. patent application Ser. No. 09/782,890 filed Feb. 14, 2001, which is a continuation-in-part of U.S. patent application Ser. No. 09/373,428 filed Aug. 13, 1999 and now U.S. Pat. No. 6,180,879, which is a continuation-in-part of U.S. patent application Ser. No. 09/003,244 filed Jan. 6, 1998, and now U.S. Pat. No. 5,959,246, which is a continuation-in-part of U.S. patent application Ser. No. 08/773,413 filed Dec. 27, 1996, and now U.S. Pat. No. 5,736,674, which is a continuation in part of U.S. patent application Ser. No. 08/667,083 filed Jun. 20, 1996, now abandoned.

All of the above applications and their issued patents are referred to herein and are incorporated herein in their entirety.

All of the previous commercial embodiments of applicant's invention used a faceplate, with flanges along all four sides. However, in the first embodiment of this invention, the faceplate with flanges along two opposite sides, here the wide sides, are eliminated. The sides are preferably closed and are joined at their corners in a manner that the product is tapered inward. The sides are made of a thin plastic that is thin, cuttable, and flexible to accommodate being placed on a large variety of boxes. Preferably all the sides are the same depth with two wide and two narrow sides, but some may be foreshortened if desired, especially the narrow sides.

The first embodiment of the insulating sleeve and box extender of this invention not only provides a product with great versatility to accommodate a wide variety of electrical boxes, it also can be readily be ganged together by placing adjacent boxes next to each other. The cuttable walls permit ready cutting to accommodate unusual situations and may be precut if a sufficient quantity of a special part is needed.

In a third and preferred embodiment of the sleeve and box extender, two opposite sides are inchoate flangeless members. A removable flange is provided along two opposite sides, usually the wide sides. A permanent flange is provided for the two opposite remaining sides, preferably the narrow sides of the sleeve. The two opposite inchoate flangeless members give added flexibility in using the sleeve for either a single-device or multiple-device electrical boxes. For use with a single-device electrical box, the inchoate flangeless member along each wide side of the sleeve are retained and help to cover the electrical box opening and some of the surrounding wall surface. For use with a multiple-device electrical box, the inchoate flangeless members along each wide side of abutting sleeves are removed, thereby allowing adjacent sleeves to fit tightly against one another. Those members that are not adjacent another sleeve may be retained to cover the electrical box opening and some of the surrounding wall surface. Score or other weakening lines are provided on the back side of the inchoate flangeless members to allow their easy removal. Scissors, a utility knife, or a similar tool or a hand may be used to remove the inchoate flangeless members along the weakening lines.

OBJECTS AND ADVANTAGES

The present invention provides a one-piece, thin, cuttable, insulating, flexible plastic sleeve and electrical box extender with flanges on two opposite sides, which will extend electrical boxes from a position deep within an interior surface of a building to a new position that is flush with a newly installed surface and/or provide insulation. The part can accommodate a wide variety of sizes of electrical boxes and can be easily ganged together. An embodiment having inchoate flangeless members provides the advantage of easy conversion from a sleeve for use with a single-device electrical box to a sleeve for use with a multiple-device electrical box.

DESCRIPTION OF THE DRAWINGS

FIG. 2 is a front view of the outer end of the sleeve and box extender shown in FIG. 1.

FIG. 3 is a sectional view of FIG. 2 taken on section 3-3.

FIG. 5 is a front view of the outer end of a second embodiment of the sleeve and box extender having sides tapered in thickness.

FIG. 6 is a sectional view taken on section 6-6 of FIG. 5.

Figure 1:
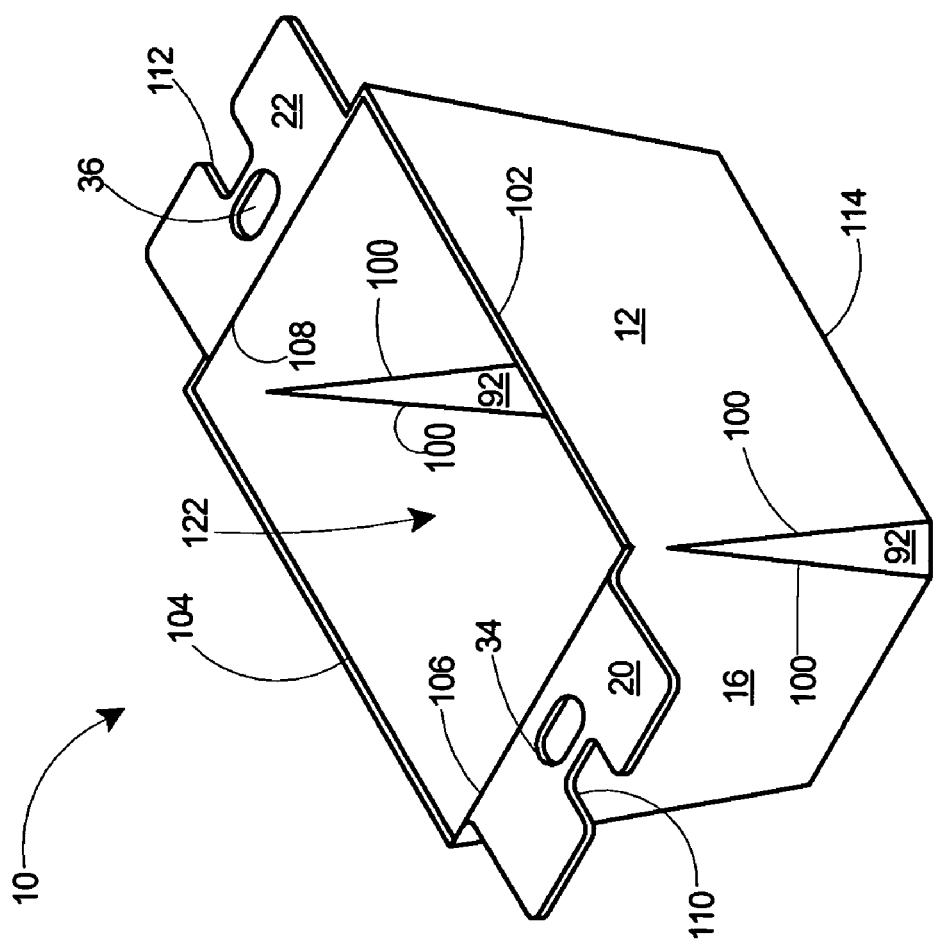
FIG. 1 is a perspective view of the preferred embodiment of the sleeve and box extender.

INDEX TO REFERENCE NUMERALS IN DRAWINGS 10 sleeve, part, or box extender
12 wide side
14 wide side
16 narrow side
18 narrow side
20 flange on narrow side
22 flange on narrow side
34 aperture in flange
36 aperture in flange
42 existing wall -continued 44 newly installed wall
46 electrical box
48 side walls of electrical box
50 back wall of electrical box
52 flange of electrical box
54 threaded aperture
56 electrical device
58 ear of duplex outlet
60 slot
62 aperture in duplex outlet
64 long screw
66 cover plate
68 screw
70 aperture in cover plate
80 second embodiment of sleeve with tapered thickness sidewalls
92 corner
100 line
102 outer edge of wide side
104 outer edge of wide side
106 outer edge of narrow side
108 outer edge of narrow side
110 U-shaped cutouts or apertures
112 U-shaped cutouts or apertures
114 inner edge of wide side
116 inner edge of wide side
118 inner edge of narrow side
120 inner edge of narrow side
122 area of outer opening
124 area of inner opening
200 third embodiment of sleeve having inchoate flangeless members
202 inchoate flangeless member
204 inchoate flangeless member
206 score or weakening line
208 score or weakening line
212 outer surface of wide side
214 outer surface of wide side
216 back surface of inchoate flangeless member
218 curved sidewall
220 flat sidewall
222 single-device electrical box
230 multiple-device electrical box
241 first sleeve
242 second sleeve
243 third sleeve
244 fourth sleeve
245 fifth sleeve
246 sixth sleeve
252 outside edge of outermost sleeve
254 outside edge of outermost sleeve
262 inside or abutting edge of sleeve
264 inside or abutting edge of sleeve
270 portion of cover member
300 fourth embodiment of sleeve
302 open corners

DETAILED DESCRIPTION OF THE INVENTION

The invention is a plastic one-piece plastic, flexible, cuttable, insulating sleeve having two opposite flanges for use as a box extender for extending an existing electrical box to bring it flush with a newly installed surface in a building and/or a device insulator which provides insulation between an electrical device and an electrical box.

A perspective view of the preferred embodiment of the one-piece insulating sleeve 10 of the present invention is shown in FIG. 1. The sleeve 10 consists of a one-piece plastic member having an outer opening at an outer end and an inner opening at an inner end with four integral sides 12, 14, 16, and 18 forming an electrical box extender and insulator or device protector. The sides consist of wide sides 12 and 14 and narrow sides 16 and 18. The sleeve 10 has flanges only on two opposite sides with no flanges on the remaining opposite side. The wide sides 12 and 14 terminate at an outer edge 102 and 104, respectively. Flanges 20 and 22 extend from the outer edges 106 and 108, respectively, of narrow sides 16, 18. The flanges have apertures 34, 36 for receiving screws that are typically 0.145 inch in diameter. The apertures are preferably oblong or elongated with the long dimension being 0.310 inch and the short dimension being 0.150 inch. The flanges 20, 22 serve to carry apertures 34 and 36 to rest on the new wall but need not do so. The flanges 20, 22 are flat and thin and approximately 0.04 inch thick so that they can fit in the recessed underside (not shown) of cover plate 66. The flanges 20, 22 extend approximately 1.5 inches in width, which is shorter than the inner width at the outer edges 106, 108 of the sleeve 10. The sleeve 10 is approximately 1.77 inches across its inside width. The end flanges preferably have U-shaped cut outs or apertures 110 and 112 centered on the outer edges with a width of approximately 0.31 inch and a depth of approximately 0.28 inch. The U-shaped cutouts 110, 112 accommodate the heads of screws in some installations. The sides 12, 14, 16, 18 form a generally rectangular tubular sleeve portion capable of receiving an electrical device and of being received within an electrical box.

The sides 12, 14, 16, and 18 are thin and planar and converge inward as viewed from the outer edges 102, 104, 106, and 108, towards the inner edges 114, 116, 118, and 120, respectively.

FIG. 2 is a top view of the outer end of the sleeve showing the flanges 20, 22 with apertures 34, 36 and sides 12, 14, 16, and 18.

Figure 4:
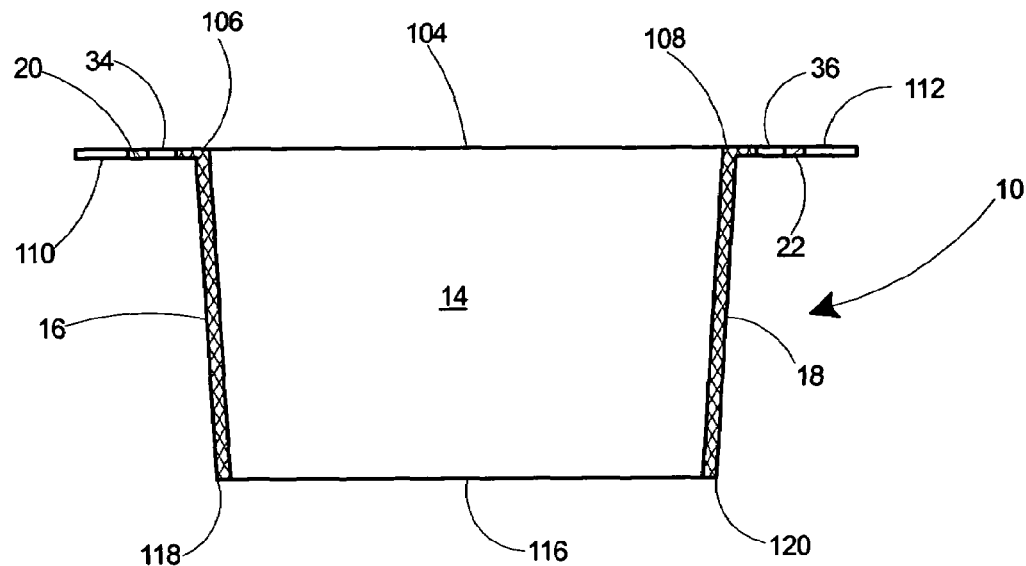
FIG. 4 is a sectional view of FIG. 2 taken on section 4-4.

FIG. 4 shows the wide side 14 which has an inside length between outside edge 106 and outside edge 108 of 2.836 inches and converges inward so that the inside length along the center line between outer edge 106 and outer edge 108 is 2.610 inches. The dimensions of side 12 are similar to the dimensions of side 14.

With reference to FIG. 3, there is a cross-section 3-3 of FIG. 2, which shows narrow side 18 in the end view with wide sides 12 and 14 at each end. It is to be noted that FIGS. 3, 4, 6, and 7 are all scaled to a larger dimension than FIGS. 2 and 5. The outer edge 104 and inner edge 116 of side 14, the outer edge 102 and inner edge 114 of side 12 are shown.

With reference to FIG. 4, there is a cross-section 4-4 of FIG. 2, which shows outer edge 104 and inner edge 116 of wide side 14. There is also shown flanges 20 and 22, apertures 34 and 36, and U-shaped cutouts or apertures 110 and 112.

As can be seen in FIGS. 3 and 4, the sides converge inward from the outside edge to the inside edge. In the first embodiment shown in FIG. 3, the width on the inside at the outer end from outer edge 104 to outer edge 102 of narrow side 18 is 1.770 inch and converges inward so that the inside width between inner edge 114 and inner edge 116 across the narrow side 18 as measured on the center line is 1.687 inches. The same dimensions are also found on narrow side 16. Thus the sides are seen to have a slight inward taper and are trapezoidal but need not be as shown in the figures.

The above dimensions do not take in consideration the inside area of the inner opening where the corners use triangles for making the corner, as shown in FIG. 1. These triangles can be rounded or eliminated if desired.

The four sides 12, 14, 16 and 18 are each flat, thin plastic members having a thickness of approximately 0.03125 to 0.06 inch, and more preferably 0.040 inch. The narrow sides 16 and 18 are preferably 1.77 inch inside width at the outer end. The wide sides 12 and 14 are preferably approximately 2.836 inches wide as measured inside at the outer end. The depth of the sides of the sleeve and box extender 10 as measured from the outer end to the inner end is preferably approximately 1.75 inches.

Preferably the depth of the sides is the same for all four sides. However, the two narrow sides may be shorter than the two wide sides or vice versa. Also, the inner end of the side may be pre-cut to fit obstructions or cut by the installer at the job site. The depth of the sides can be as little as ⅝-inch deep but generally are between ⅞-inch and 1.85 inches deep and more preferably approximately 1.75 inches deep.

The four sides are connected where they meet one another by a suitable corner 92. This corner 92 (1) may form a right angle between the adjacent sides, (2) may be slightly rounded, or (3) may be a combination of these or similar configurations. The corner may be eliminated except for a short connector between the four sides where they meet near the outer opening. The triangle joins the adjacent sides along a line 100 and is approximately 0.25 inch wide at the base and extends toward the apex at the outer end to approximately 0.25 inch below the outer end.

Figure 8:
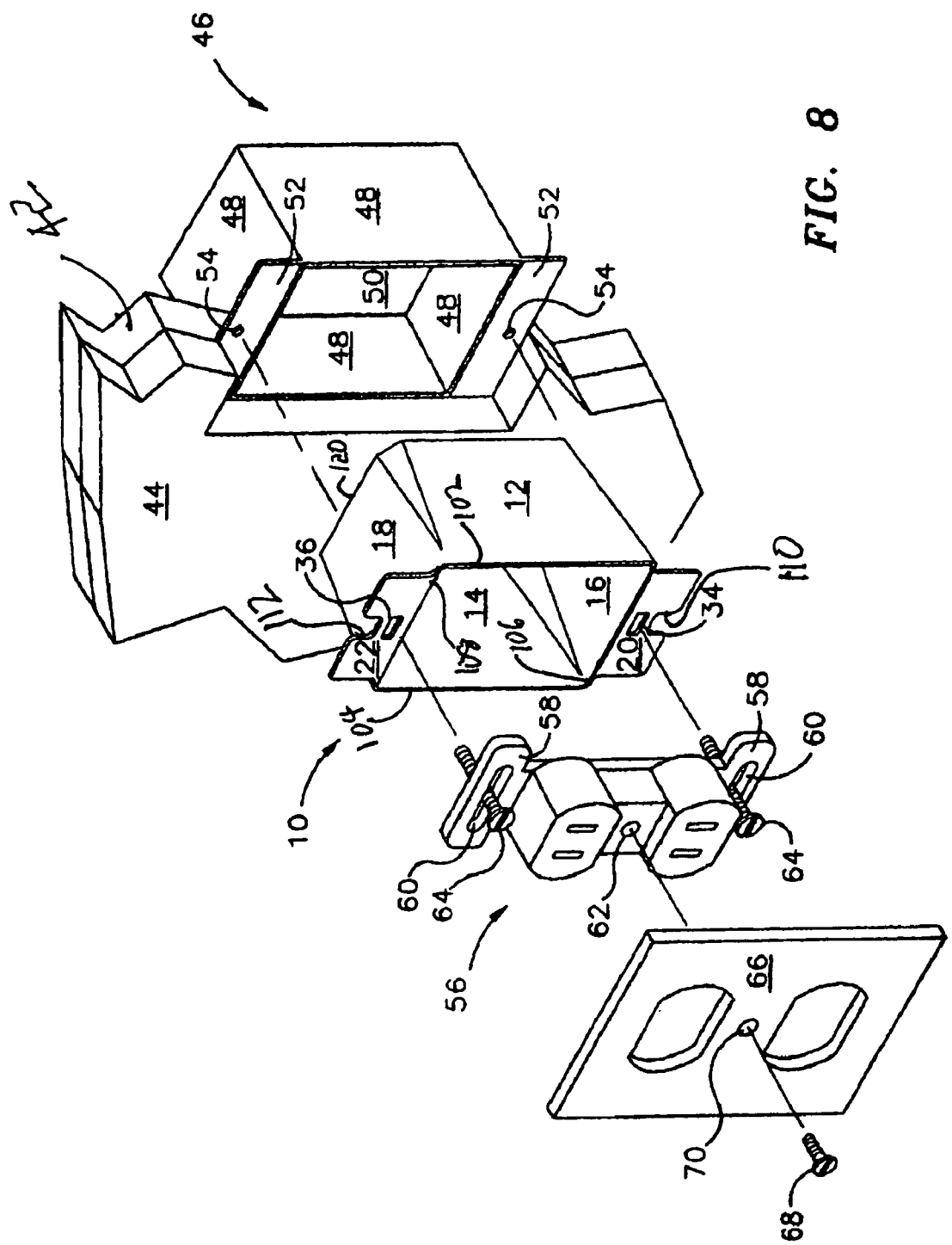
FIG. 8 is an exploded view taken of the sleeve of FIG. 1 including an electrical box with a wall, a duplex outlet, and a cover plate.
Figure 9:
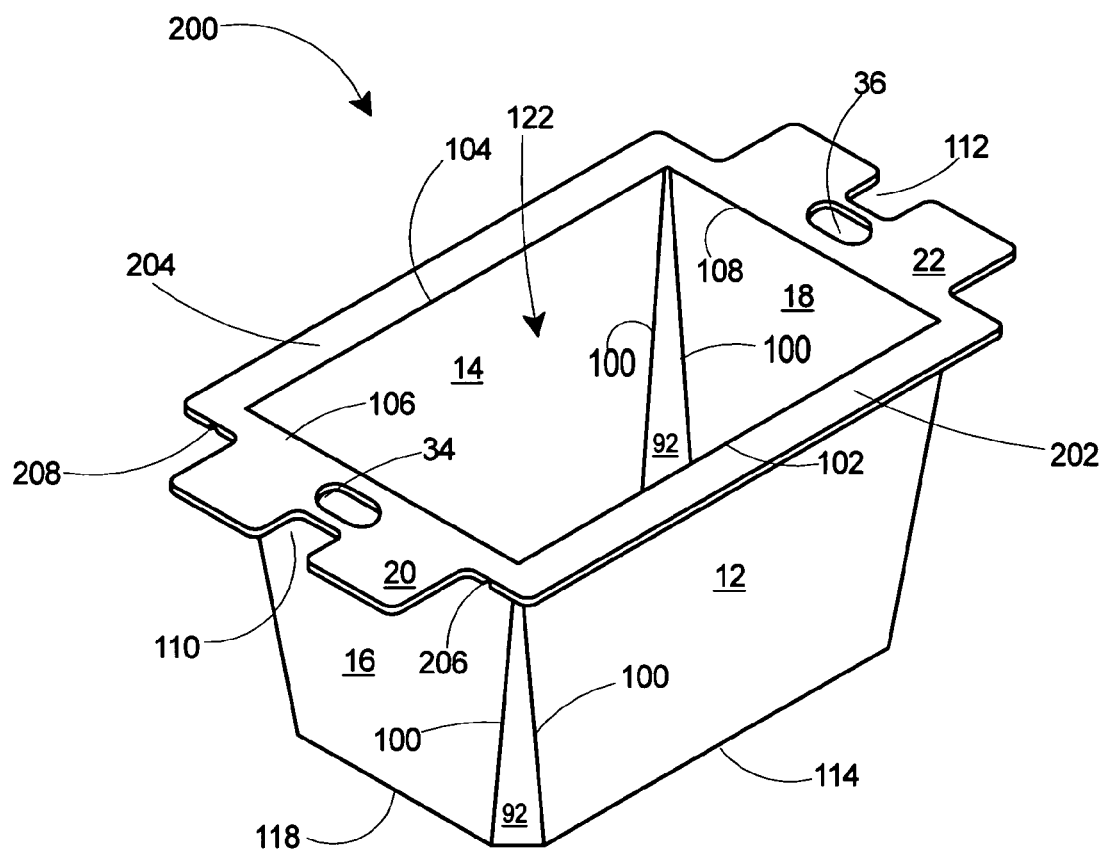
FIG. 9 is a perspective view of a third embodiment of the sleeve and box extender with removable flanges along the wide sides.
Figure 10:
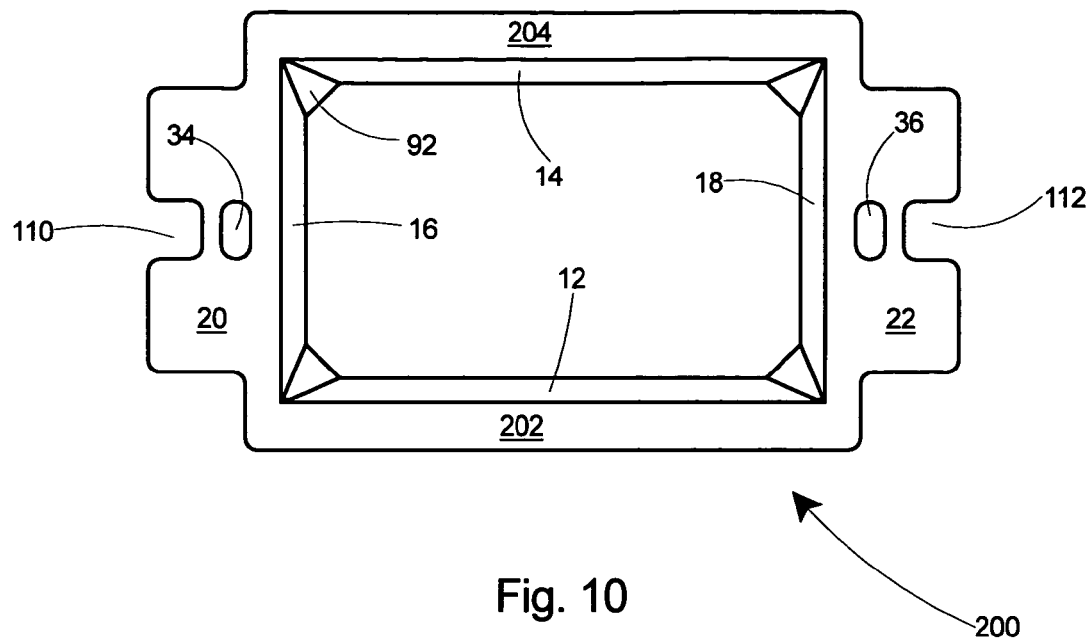
FIG. 10 is a front view of the outer end of the sleeve and box extender shown in FIG. 9.

The sleeve or electrical box extender 10 is typically installed as shown in FIG. 8, which is an exploded perspective view with a cutaway section of an existing wall 42 and a newly installed wall 44. FIG. 8 shows a typical arrangement when installing the box extender 10 to an existing electrical box 46, which has had a newly installed wall 44 on the existing wall 42. The arrangement in FIG. 8 shows the box extender 10 with the existing electrical box 46 installed flush with the existing wall 42, the newly installed wall 44 on top of the existing wall 42, an opening cut in the newly installed wall 44, an electrical device 56 (in this case a duplex outlet), and a cover plate 66.

Referring to FIG. 8, the existing electrical box 46 has side walls 48 and a back wall 50. The electrical box 46 has flanges 52 and threaded apertures 54 within the flanges for receiving screws 64. These threaded apertures 54 are the same apertures that are in the electrical box 46 originally for receiving the screws that thread through the ears of an electrical device and secure the device to the box.

In a common application of the invention, the existing outlet (not shown in FIG. 8) is removed from the electrical box 46. The box extender 10 is then pushed into the electrical box 46 with the wide sides 12, 14 and narrow sides 16, 18 pushed in between the side walls 48 of the electrical box 46. The wide sides 12, 14 and narrow sides 16, 18 of the box extender are capable of converging inward with the area of the outer opening 122 being larger than the area of the inner opening 124. The electrical device may be inserted into the box extender before being inserted.

The sleeve or box extender is made from a thin flexible plastic material with sides that flex to the extent necessary as the product is inserted into the electrical box 46, thereby accommodating a wide range of sizes of electrical boxes. If the existing wires enter the electrical box 46 from the side walls 48 and those wires interfere with the travel of the wings of the box extender into the box, then a portion of the plastic sides 12, 14, 16, 18 may be easily manually trimmed with scissors or the like to keep the wires from interfering with the travel of the sides into the electrical box 46. If the existing wires enter the electrical box 46 through back wall 50, there will usually be no interference of the wiring with the travel of the sides of the box extender 10 into the electrical box 46 and trimming of the wings is therefore unnecessary.

The box extender 10 is fully seated and abutted against the newly installed wall 44 and aligned with the electrical box 46. The duplex outlet 56, switch, or other electrical device is then aligned with the box extender 10. FIG. 8 depicts a duplex outlet 56 in alignment with the box extender 10, which in turn is in alignment with the electrical box 46. The slots 60 in the ears 58 of the duplex outlet 56 are in alignment with the apertures 34, 36 in the respective flanges 20, 22 of the box extender 10 and the apertures 34, 36 are also in alignment with the threaded apertures in the electrical box 46. One long screw 64 is pushed through slot 60 in the top ear 58 of the duplex outlet 56, through the aperture 46 in flange 20, and screwed into threaded aperture 54 in the top flange 52 of the electrical box 46. A second long screw 64 is pushed through slot 60 in the bottom ear 58 of the duplex outlet 56, through the aperture 34 in flange 20, and screwed into threaded aperture 54 in the bottom flange 52 of the electrical box 46. Both screws 64 are then tightened the proper amount to abut the inward surfaces of flanges 20 and 22 against the surface of the newly installed wall 46. Both screws 64 may be trimmed to a shorter length or shorter screws may be used if required by a thin newly installed wall 44 or a shallow electrical box 46.

After the duplex outlet 56, switch, ground fault circuit outlet, or other electrical device is secured to the electrical box 46, a cover plate 66 may be fastened with a screw 68 through the aperture 70 in the cover plate 66 and into the threaded aperture 62 in the duplex outlet 56, switch, ground fault circuit outlet, or other electrical device. This completes the task of extending the existing electrical device to the new surface 44 without installing a new electrical box or moving the existing electrical box 46. The electrical device is now flush with the new wall surface 44 and is aesthetically pleasing to the eye.

Suitable materials of construction for this invention include a flame-retardant nylon having an Underwriters' Laboratories rating for flammability of 94V-O, a minimum RTI of 90-50-90, and a hot wire ignition of 3 or less. The material is rated at the above specification for a minimum of 0.040 inches (1 mm) thickness. The RTI is a temperature index (degrees Celsius) of nylon properties with the first two digits referring to "electrical", the second two digits referring to "mechanical with impact", and the third two digits referring to "mechanical without impact". Other standards organizations may have equivalent ratings. Two suitable nylons are Vydyne™ M344 nylon, Monsanto, St. Louis, Mo., US, and Akulon™ K225-KS nylon of DSM Engineering Plastics, 6130 AA Sittard, Netherlands.

Another material found to be satisfactory is a polyolefin, such as a polypropylene rated for 105° C. continuous use and made by A. Schulman Company as RPP-1174. Other suitable similar plastics may be used provided the combination of the thickness of the material and flexibility of the plastic are satisfactory to provide sufficient flexibility and cuttability to enable the sides to be capable of flexing sufficiently to allow insertion in a variety of electrical boxes.

The sleeve 10 shown is also designed for use by itself as a device insulator. The sleeve 10 is used for insulating the terminal strips on a bulky electrical device, such as a GFCI, from the interior metal walls of an electrical box. One purpose is to prevent unintentional shorting or tripping of the GFCI by inadvertent contact of the terminals on the GFCI with the walls of the electrical box. Bulky electrical devices such as the GFCI are notorious for shorts caused by the tight fit of the GFCI within the electrical box.

A key feature of the sleeve and box extender is that it is flexible so that it can be readily be adapted to existing electrical boxes. The flexibility is achieved by a combination of thickness of the material and the choice of plastic. The plastics mentioned above have been found to be satisfactory, but other similar plastics may also be used provided they are sufficiently flexible and cuttable. As used herein, the cuttability is a combination of the material and its thickness. The cuttability must be achieved by tools an electrician would ordinarily be expected to carry, such as a knife, scissors, or similar cutting devices.

The material forming the sides must be between approximately 0.03125 and 0.06 inch in thickness and is preferably approximately 0.040 to 0.045 inch thick. The maximum thickness is approximately 0.06 inch to be satisfactory with existing electrical boxes. These thickness specifications apply when the sides are relatively uniform in thickness. The thickness of the sides may, however be tapered as shown in the second embodiment 80 of FIGS. 5, 6, and 7.

The thickness of the sides are not as important for the first ¼ inch of depth as measured from the outer edges of the part. The sides in this first ¼ inch of depth may be substantially thicker. Therefore, the thickness of the sides as mentioned herein usually refers to the thickness of the sides in the area extending beyond the first ¼ inch of depth to the inner end of the sides.

Figure 7:
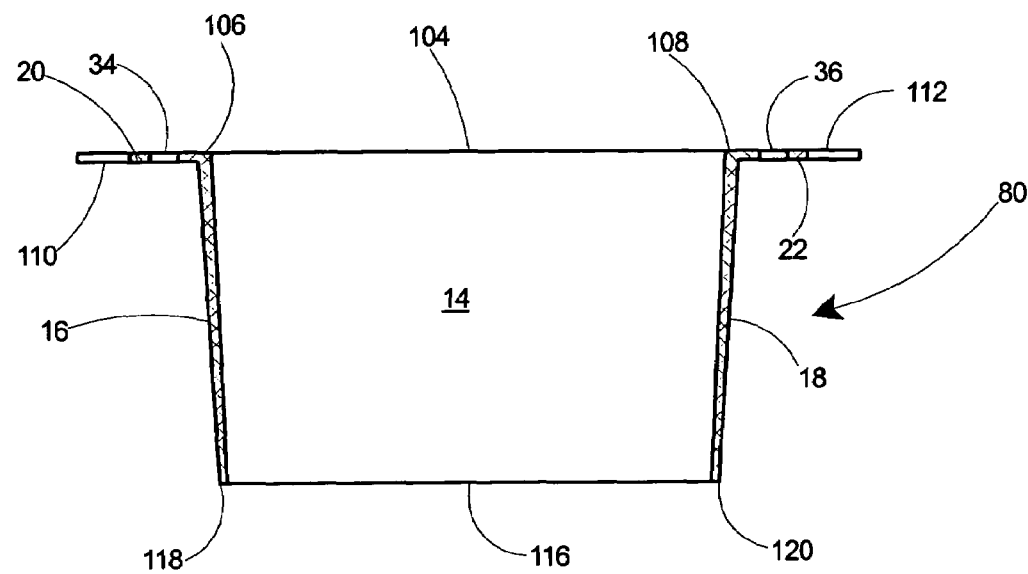
FIG. 7 is a sectional view taken on section 7-7 of FIG. 5.

With reference to the second embodiment of the sleeve or box extender 80 shown in FIGS. 5-7, the same reference numerals are used to identify the various parts of the second embodiment 80. The thickness of the sides is preferably approximately 0.040 inch at the inner end and approximately 0.060 inch at the outer end. The thickness of the sides in the first ¼ inch below the outer end may be slightly thicker than the 0.060 inch.

The flangeless wide sides where the part is of uniform thickness is an important advantage since two parts can abut one another along their wide sides and thus be ganged together. This will permit a series of parts up to five and possibly more to be ganged together for some electrical boxes. It is important that the apertures 34, 36 be elongated so that the thickness of the sides can be accommodated by small shifts in the location of the elongated aperture so as to permit the screw to pass through.

A third and preferred embodiment of the sleeve or box extender 200 is shown in FIGS. 9-13. This embodiment of the sleeve 200 includes inchoate flangeless members 202, 204 along its wide sides 12, 14 that allow it to be used as is to insert an electrical device in a single-device electrical box or, by removing members 202, 204, which can then be used to insert several electrical devices in a multiple-device electrical box.

The term "inchoate flangeless members" is used to indicate that these members are capable of transiting to their eventually being flangeless when such is desired. The "flangeless" is only partly in existence and incomplete until members 202 and 204 are removed.

Figure 11:
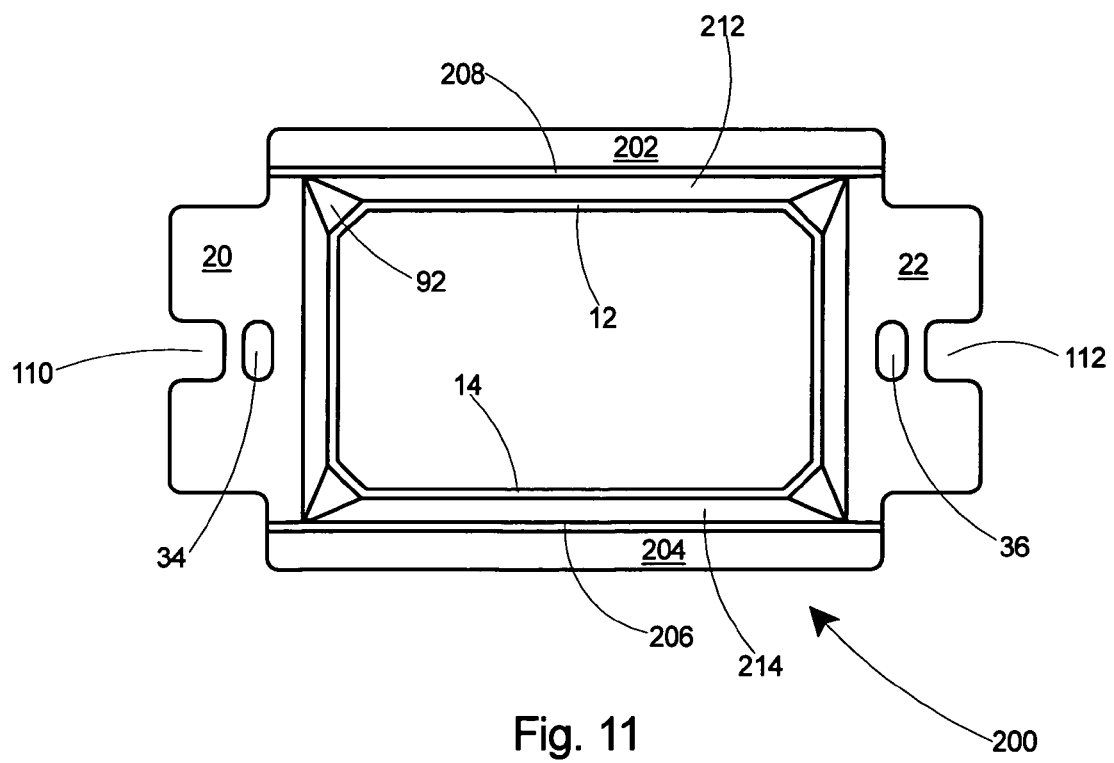
FIG. 11 is a back view of the outer end of the sleeve and box extender shown in FIG. 9.
Figure 12:
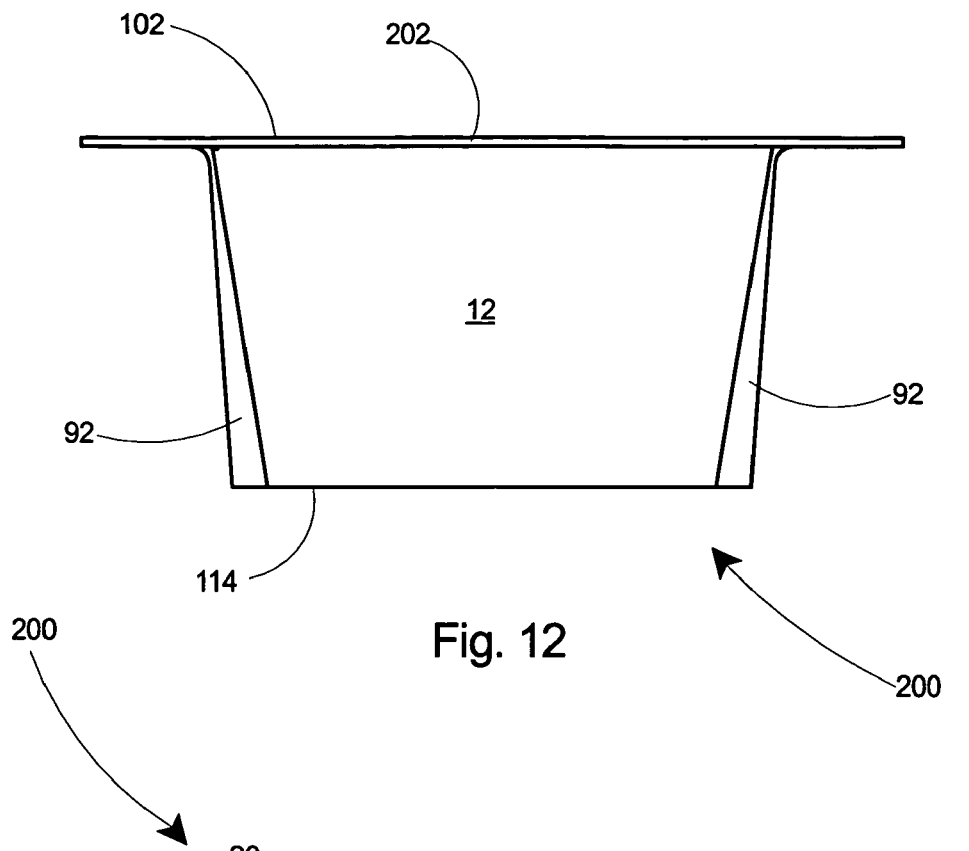
FIG. 12 is a sectional view of FIG. 10 taken on section 12-12.

As shown in the back view of the sleeve 200 in FIG. 11, the members 202, 204 include score or weakening lines 206, 208 adjacent to the outer surfaces 212, 214 of the wide sides 12, 14. The score or weakening lines 206, 208 provide a convenient narrow thickness channel adjacent the outer surfaces 212, 214 at which the members 202, 204 can be removed by the use of a utility knife, scissors, similar tool, or by hand. The weakening can utilize any method to accomplish the function such as scoring, perforating, or similar techniques.

Figures 13, 13A:
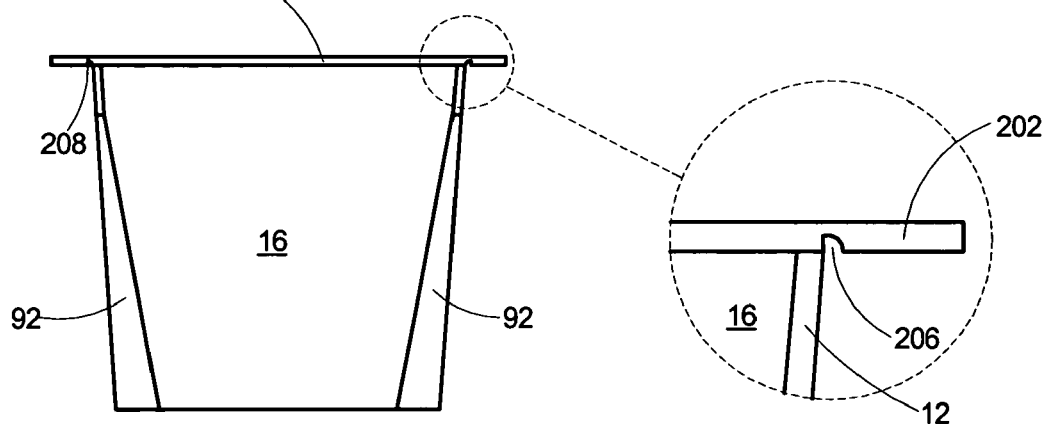
FIG. 13 is a sectional view of FIG. 10 taken on section 13-13.
FIG. 13A is a detailed view of the top corner of FIG. 13.

With reference to FIGS. 13 and 13A, the score lines 206, 208 are formed in the back surface 216 of the members 202, 204 adjacent the outer surfaces 212, 214 of the wide sides 12, 14. As shown in FIG. 13A with the detailed depiction of weakening line 208, the lines are shaped with a curved sidewall 218 and a flat sidewall 220 so that an inserted utility knife blade (not shown) will be guided into the deepest part of the score line, or flush against the outer surface 214 of the sleeve 200. This ensures that the members 202, 204, when removed, will be flush with the outer surfaces 212, 214 of the wide sides 12, 14 and not project outwardly there from. This will insure a flush fit between the outer surfaces of separate sleeves when they are abutted together in a multi-device electrical box.

Figure 14:
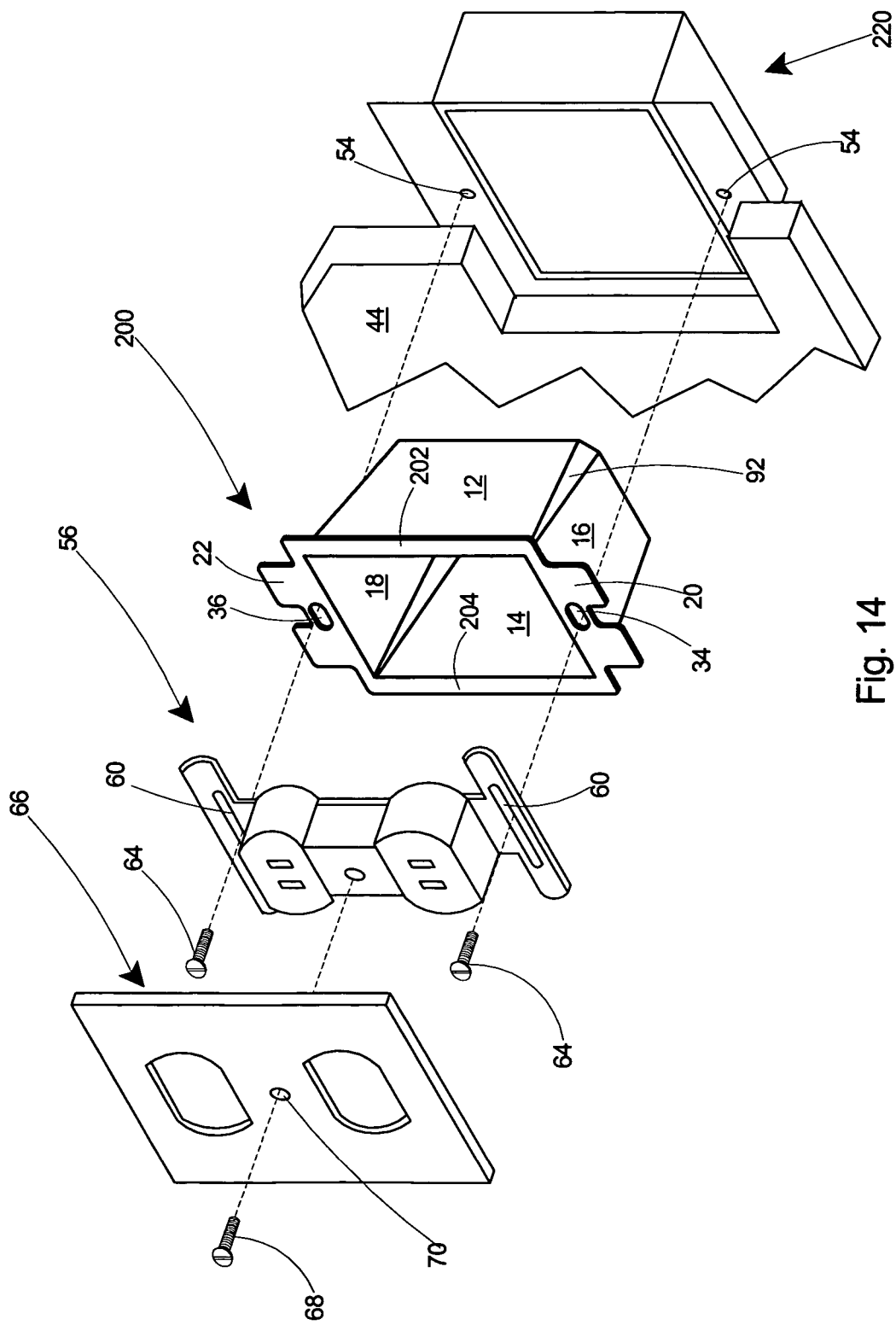
FIG. 14 is an exploded view of the third embodiment of the sleeve being used in a single-device electrical box.

The use of the third embodiment of the sleeve 200, having members 202, 204 along the wide sides 12, 14, is illustrated for a single-device electrical box 222 in FIG. 14. As shown in FIG. 14, the slots 60 of an electrical device, in this case a duplex outlet 56, are aligned with the apertures 34, 36 in the narrow side flanges 20, 22 of the sleeve 200 and also aligned with the threaded apertures 54 in the single-device electrical box 222. Screws 64 are then inserted there through and tightened to secure the duplex outlet 56 against the electrical box 220. The length of the screws 64 can be selected for the particular job. If the sleeve 200 and electrical device 56 were installed on an electrical box 222 having a newly installed wall, then longer screws would be selected to bridge the distance between the electrical device 56 and the threaded apertures 54 of the box 222. If internal wiring in the existing electrical box 222 inhibits the travel of the sleeve 200 into the box, the corners 92 of the sleeve 200 could easily be cut to allow one or more of the sides 12, 14, 16, 18 to flex inwards to allow clearance around the obstruction and thereby allow the sleeve 200 to fit completely into the box 222 so that the back side of the flanges 20, 22 and back side of the members 202, 204 can be tightened flush against the wall surface 44. For the single-device electrical box 222 as shown in FIG. 14, the members 202, 204 are typically not removed as the members 202, 204 do not impede installation of an electrical device 56 in a single-device electrical box 222.

Figure 15:
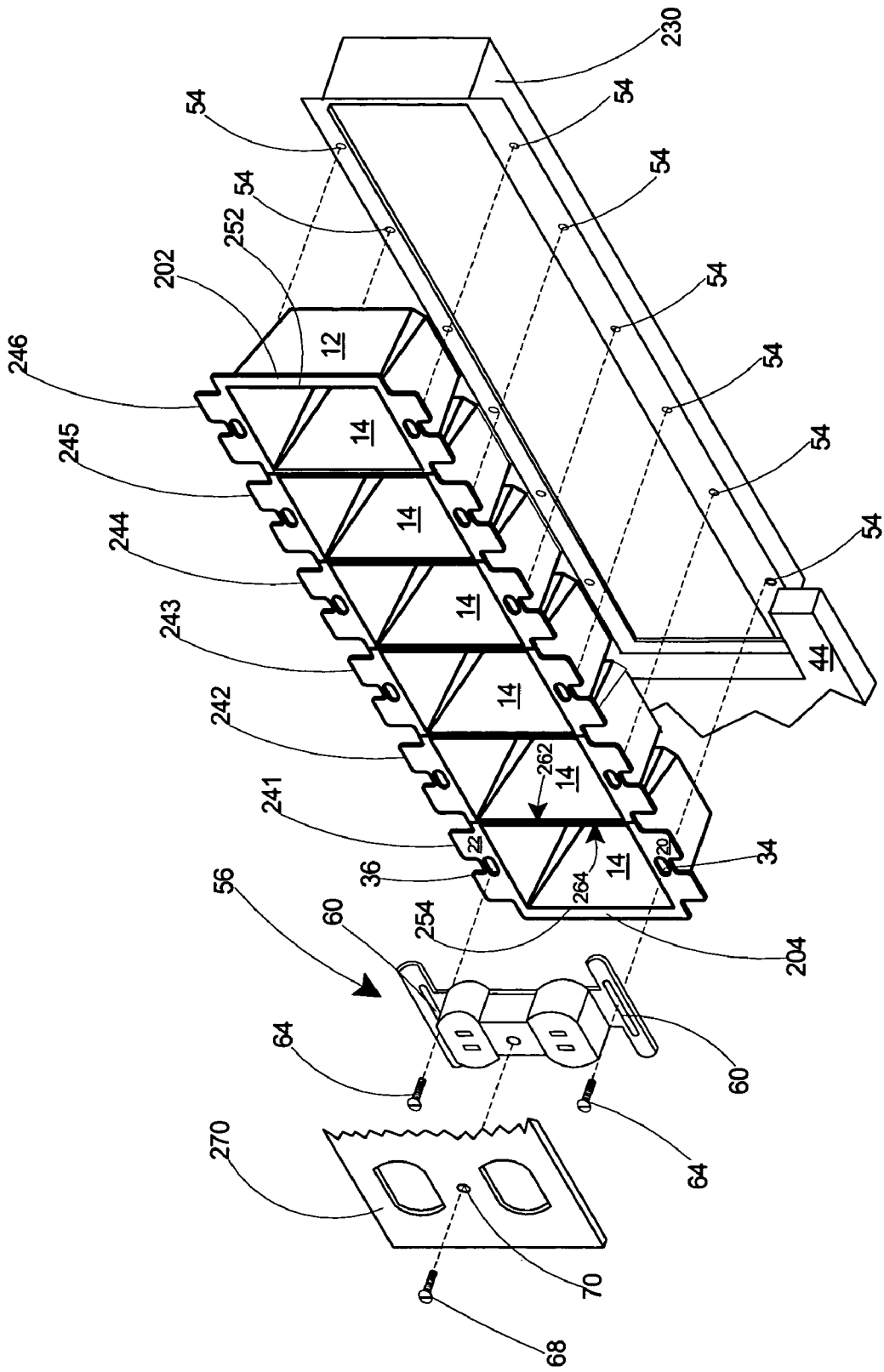
FIG. 15 is an exploded view of the third embodiment of the sleeve being used in a multiple-device electrical box.

With the increased use of computers and numerous other electrical equipment in the typical home, it has become common to install multiple-device electrical boxes such as box 230 shown in FIG. 15. The multiple-device electrical box 230 shown in FIG. 15 is capable of accommodating up to six separate electrical devices. The multiple-device electrical box 230 typically includes threaded apertures 54 to accept the mounting screws 64 of several separate electrical devices. In this case, six separate electrical devices, one of which is shown, can be accommodated. For use with a multiple-device electrical box, an installer will typically remove the members 202, 204 on all the inside edges of the wide sides 12, 14 of the separate sleeves. In FIG. 15, for example, there are six sleeves 241, 242, 243, 244, 245, and 246. As shown in the drawing, the members 202, 204 are retained on the outside edges 252, 254 of the outermost sleeves 241 and 246. The members have been removed on all the inside or abutting edges of all of the sleeves. As an example see edge 262 on sleeve 241, which abuts edge 264 on sleeve 242. By providing members 202, 204 on the wide sides 12, 14 of the sleeves, the sleeve serves as a dual-purpose sleeve, capable of bridging the gap between the electrical box and the surrounding wall on a single-device electrical box and capable of accepting a large-bodied electrical device, such as a GFCI, in a multiple-device electrical device. Since electrical boxes are produced in standard sizes, without an inchoate flangeless member along the wide sides, the inner volume of the sleeve would be restricted to a smaller size and not be capable of accepting a large-bodied electrical device. Therefore, the third embodiment of the sleeve or box extender enables an installer to easily secure an electrical device, including a large electrical device such as a GFCI, in either a single-device or multi-device electrical box depending on the user's needs or wants.

For simplification purposes, only one electrical device 56 is depicted in FIG. 15. This electrical device 56 is being secured to sleeve 241. Additional electrical devices would be connected to sleeves 242, 243, 244, 245, and 246 in an analogous manner. A portion of a cover member 270 is depicted in FIG. 15. The manufacturer of the multi-device electrical box 230 typically supplies the cover member. Although only the left side portion is shown, it should be understood that the cover member 270 typically is sized to cover the entire box 230.

Figure 16:
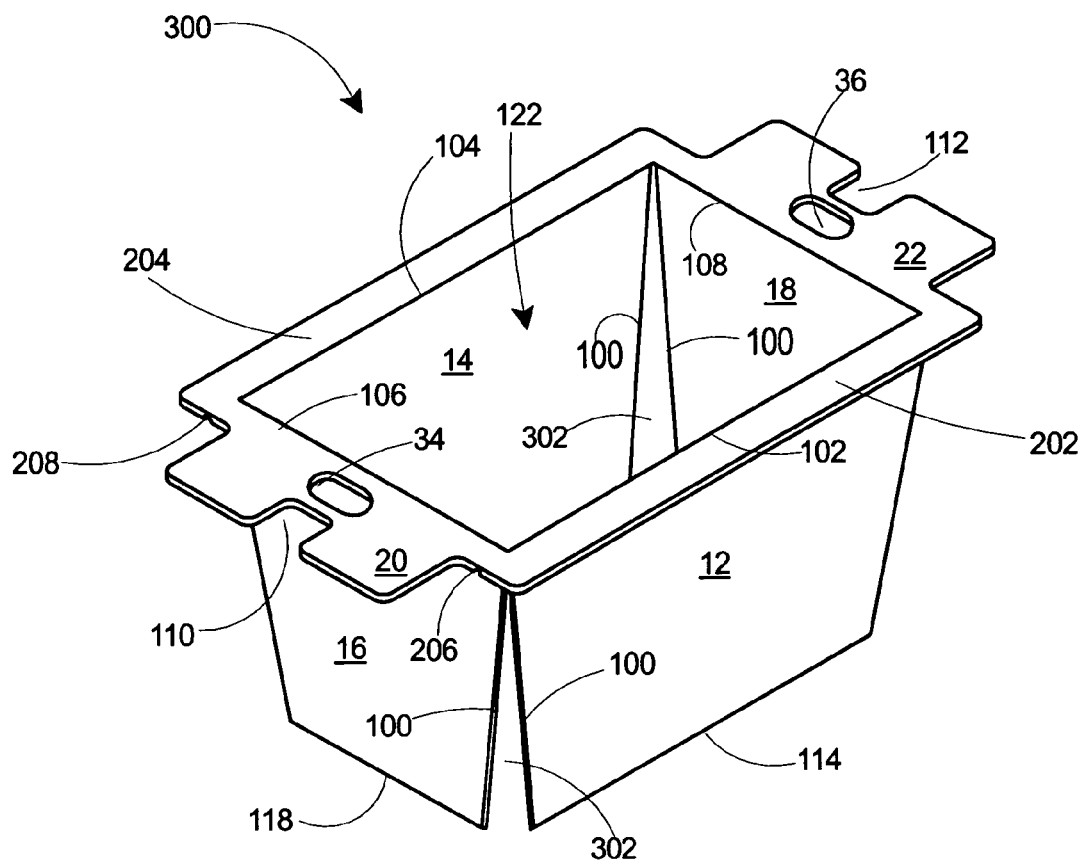
FIG. 16 is a perspective view of a fourth embodiment of the sleeve and box extender having inchoate flangeless members along the wide sides and open corners between the side members.

A perspective view of a fourth embodiment of the sleeve and box extender 300 is depicted in FIG. 16. This sleeve 300 includes members 202, 204 along the wide sides 12, 14 similar to that of the third embodiment. The fourth embodiment however, is provided with open corners 302 between the side members 12, 14, 16, and 18. The corners are open except at the very top where there is a connector for the adjacent sides (not shown in the perspective view). This sleeve 300 may be used on either a single-device or multiple-device electrical box in the same manner described for the third embodiment. However, since the corners 302 are open and not closed, there is no need to slit or cut the corners 302 if the space within the electrical box is restricted as a result of wiring connections. The sides 12, 14, 16, 18 of the sleeve 300 depicted in FIG. 16 will naturally flex inward if desired to clear wiring or other obstructions within the electrical box.

A person of ordinary skill in the art will recognize that numerous variations of the sleeve and box extender are possible by utilizing the principles set forth herein. Although there has been shown and described an example of what is at present considered preferred embodiments of the present invention, it will be obvious to those skilled in the art that various changes and modifications may be made therein without departing from the scope of the invention as defined by the appended claims.

What is claimed is:

1. A one-piece plastic extender for securing to an electrical box comprising:
   a sleeve having an outer opening at an outer end and an inner opening at an inner end;
   said sleeve having four sides including a first pair of sides opposite one another and a second pair of sides opposite one another;
   four corners connecting said four sides;
   each of said sides having an outer surface, an outer edges and an inner edge;
   a flange extending sideways from each of said outer edges of said first pair of opposing sides;
   inchoately flangeless members extending sideways from said second pair of opposing sides, said inchoately flangeless members including a rear surface;
   a weakening line in said rear surface of each of said inchoately flangeless members;
   said weakening lines adjacent said outer surface of said sides, said weakening lines including a channel having a flat sidewall adjacent said outer surface of said second pair of opposing sides and an adjacent sidewall opposite said flat sidewall;
   said channel including said flat sidewall and said adjacent sidewall ensuring that said flangeless members when removed are flush with said outer surface of said sides;
   said flanges and said inchoately flangeless members being sufficiently thin to be recessed under a cover plate;

said sides forming a generally tubular body sized to receive an electrical device;

said sides being made of a flexible plastic; and said sides from about a quarter of an inch below said flanges and said member to said inner edges having a thickness of no greater than 0.06 inch, thereby allowing said tubular body to be received in a variety of electrical boxes.

* * * * *